UNITED STATES PATENT OFFICE.

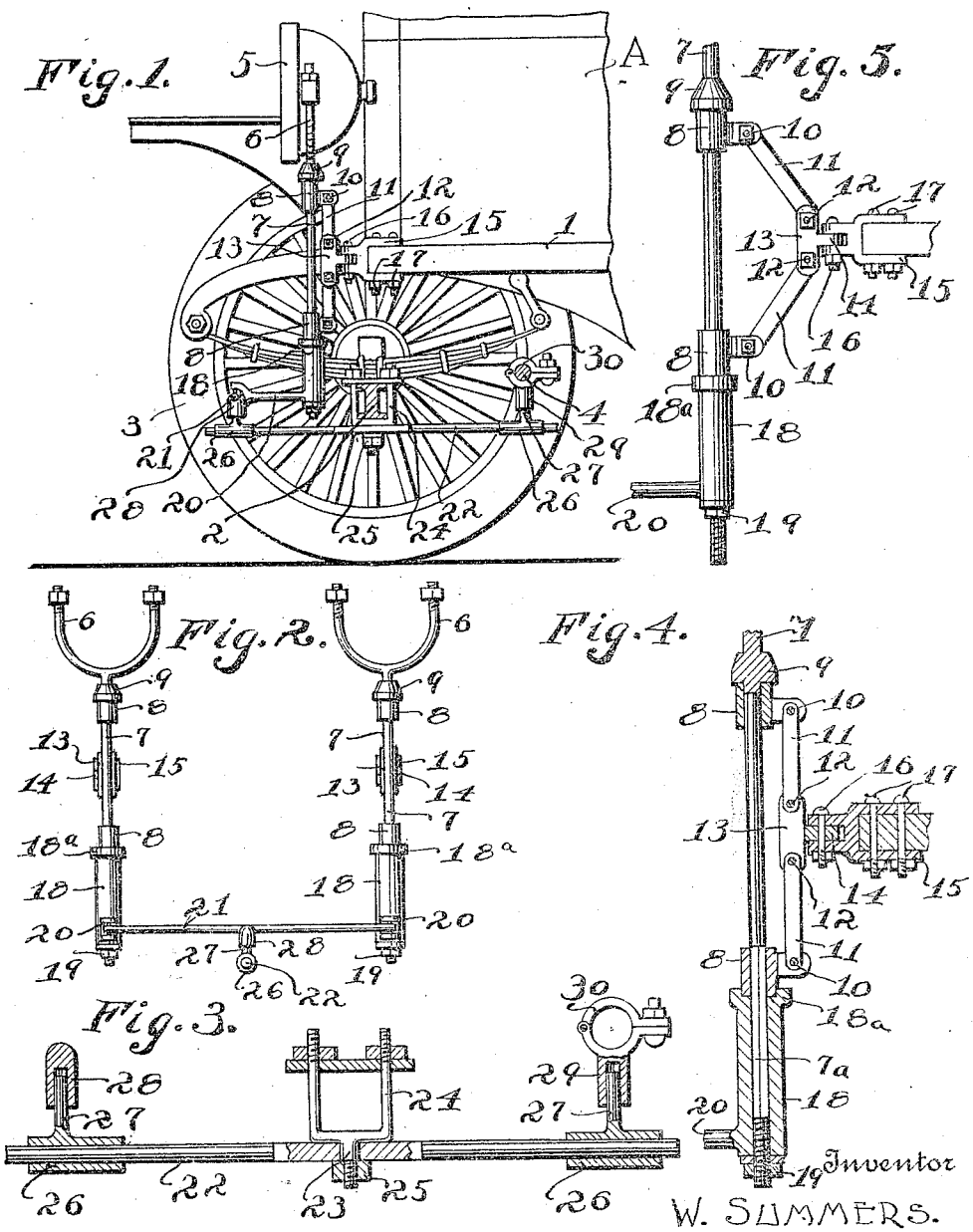

WALTER SUMMERS, OF HOLLSOPPLE, PENNSYLVANIA.

DIRIGIBLE-HEADLIGHT CONSTRUCTION.

1,296,568.  Specification of Letters Patent.  Patented Mar. 4, 1919.

Application filed September 26, 1918. Serial No. 255,778.

*To all whom it may concern:*

Be it known that I, WALTER SUMMERS, a citizen of Great Britain, residing at Hollsopple, in the county of Somerset, State of Pennsylvania, have invented a new and useful Dirigible-Headlight Construction; and I do hereby declare the following to be a full, clear, and exact description of the invention, such as will enable others skilled in the art to which it appertains to make and use the same.

The present invention relates to a dirigible headlight construction for automobiles, and has for its object to provide a device of this character which embodies novel features of construction whereby the headlights will be automatically turned when the steering gear is manipulated to turn the front wheels of the vehicle, thereby causing the light to be thrown at all times in the direction in which the vehicle is moving and enabling the driver of the vehicle to see where he is going when making a turn at night.

Further objects of the invention are to provide a dirigible headlight which can be readily applied to any conventional motor vehicle, which is adjustable to fit different designs of vehicles, which is automatic in its operation, and which will withstand the rough usage to which such devices might be subjected without danger of breaking or getting out of repair.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a side elevation of the forward end of a motor vehicle which is provided with dirigible headlights mounted in accordance with the invention, portions of the vehicle being broken away and shown in section to illustrate more clearly the manner of mounting the headlight construction upon the vehicle.

Fig. 2 is a front elevation of the dirigible headlight mounting, showing the same as detached from the vehicle.

Fig. 3 is an enlarged detail view of the operating lever and parts associated therewith, portions being broken away and shown in section to illustrate more clearly the details of construction.

Fig. 4 is a longitudinal sectional view through one of the lamp carrying brackets and associated parts, portions being broken away.

Fig. 5 is a side elevation of one of the lamp carrying brackets showing a different adjustment of the same.

Corresponding and like parts are referred to in the following description and indicated in all the views of the drawings by the same reference characters.

For the purpose of illustration the dirigible headlight construction is shown as applied to the forward end of a motor vehicle A, of which 1 designates the main frame, 2 the front axle, 3 the front wheels, and 4 the steering rod which is arranged to the rear of the axle in a substantially parallel relation thereto and is movable back and forth longitudinally to turn the front wheels and steer the vehicle to the right or to the left, as desired. The headlights 5 are of the conventional construction and are rigidly mounted upon forks 6 which are carried by the upper ends of vertical stems 7. These stems each extend downwardly through a pair of collars 8 which are carried by a bracket rigidly secured to the main frame 1, a shoulder or enlargement 9 upon the shaft resting upon the upper collar. In the present instance the two collars 8 are shown as pivotally connected at 10 to arms 11 which are in turn pivotally connected at 12 to a bracket 13, said bracket being formed with a rearwardly extending tongue 14 which is received within the bifurcated forward end of a clamp 15 and pivotally connected thereto by a vertical bolt 16. The clamps 15 are rigidly secured to the forward end of the main frame 1 at opposite sides thereof in any suitable manner as by means of the fastening members 17, and the brackets 13 can be swung about the vertical bolts 16 into any desired angular position, as may be found necessary to mount the headlights upon the particular vehicle in the most advantageous manner. The arms 11 can also be set in different angular positions to move the collars 8 toward and away from the front of the vehicle, different adjustments of the arms being indicated by Figs. 4 and 5, and after the parts have been adjusted in the desired manner the clamping bolts can be tightened to lock the parts in position.

The lower ends of the vertical shafts 7 may be square, as indicated at 7ª, and sleeves 18 are fitted thereon, said sleeves being held in position by nuts 19 which are threaded upon the lower ends of the shafts, and being formed with forwardly extending arms 20 which are pivotally connected by a cross rod 21. The upper ends of the sleeves 18 may be formed with cup shaped bearings 18ª which engage the lower collars 8.

An operating lever 22 which extends longitudinally of the vehicle is pivotally mounted at a point between its ends upon a stud 23 projecting downwardly from a U-shaped bracket 24 which is rigidly clamped upon the front axle 2. A nut 25 is shown as provided for holding the operating lever in position upon the pivot stud. The two ends of the operating lever have sleeves 26 slidably mounted thereon, said sleeves being formed with upwardly projecting pins 27. The pin 27 of the forward sleeve 26 engages a tubular bearing 28 which projects downwardly from the cross rod 21, while the pin 27 of the rear sleeve 26 engages a similar tubular bearing 29 carried by a clamp 30 which is rigidly fitted upon the steering rod 4.

In the operation of the device it will be obvious that when the steering rod 4 is moved longitudinally in the usual manner by a rotation of the steering wheel to turn the vehicle either to the right or to the left, the operating lever 22 will be swung about the stud 23 as an axis. The connections between the operating lever and the cross rod 21 are such that the cross rod will be moved longitudinally in a direction opposite to the movement of the steering rod, and this will result in swinging the arms 20 and rotating the vertical shaft 7, together with the headlights 5 which are mounted upon the upper ends thereof. The headlights will thus be turned in the same direction in which the front wheels are turned and the driver of the vehicle is thereby enabled to see where he is going when taking a sharp turn in the road after dark.

Having thus described the invention, what I claim as new and desire to secure by Letters Patent, is:—

1. A dirigible headlight for vehicles, including a clamp for engaging the vehicle frame, arms extending upwardly and downwardly from the clamp, bearing collars at the extremities of the arms, a vertical shaft extending through the collars, a lamp carried by the upper end of the shaft, a lateral arm rigid with the lower end of the shaft, an operating lever pivotally mounted between its ends on the vehicle axle, an operative connection between one end of the lever and the lateral arm of the vertical shaft, and an operative connection between the other end of the lever and the steering rod of the vehicle.

2. A dirigible headlight for vehicles, including a pair of clamps adapted to engage opposite sides of the vehicle frame, arms extending upwardly and downwardly from each clamp, bearing collars at the extremities of the arms, a vertical shaft extending through each pair of bearing collars, a headlight at the upper end of each vertical shaft, a lateral arm projecting forwardly from the lower end of each vertical shaft, a cross rod connecting the lateral arms, an operating lever pivotally mounted between its ends on the vehicle axle, an operative connection between the forward end of the operating lever and the cross rod, and an operative connection between the rear end of the operating lever and the steering rod of the vehicle.

3. A dirigible headlight for vehicles, including a pair of clamps fitted upon opposite sides of the vehicle frame, arms extending upwardly and downwardly from the clamps, bearing collars carried by the arms, a vertical shaft extending through each pair of bearing collars, a lamp at the upper end of each vertical shaft, a lateral arm projecting from the lower end of each vertical shaft, a cross rod connecting the lateral arms, an operating lever pivotally mounted between its ends on the vehicle axle, sleeves slidable on the ends of the operating lever and provided with vertically disposed pins, and tubular bearings loosely engaging the pins, one of the tubular bearings being rigid with the cross rod while the other tubular bearing is rigid with the steering rod of the vehicle.

4. A dirigible headlight for vehicles, including a pair of clamps engaging opposite sides of the vehicle frame, arms extending upwardly and downwardly from the clamps, collars carried by the arms, a vertical shaft extending through each pair of collars, a lamp rigid with the upper end of each of the vertical shafts, a lateral arm projecting forwardly from the lower end of each vertical shaft, a cross rod connecting the lateral arms, a horizontally disposed operating lever pivotally mounted between its ends on the vehicle axle, slides loose on opposite ends of the operating lever, and an operative connection between the respective slides and the cross rod and steering rod of the vehicle, said operative connection including members which rotatably and telescopically engage each other.

5. A dirigible headlight for vehicles, including a clamp adapted to engage the vehicle frame, a bracket adjustably mounted upon the clamp and adapted to be swung into different angular positions, arms extending upwardly and downwardly from the bracket and pivotally connected thereto, collars pivotally connected to the arms, a vertical shaft extending through the collars, a lamp at the upper end of the vertical shaft, and an operative connection between the lower end of the vertical shaft and the steering gear of the vehicle.

6. A dirigible headlight for vehicles, including a clamp adapted to be fitted upon the vehicle frame, a bracket pivotally mounted upon the clamp and adapted to be swung about a vertical axis into different angular positions, arms extending upwardly and downwardly from the bracket and pivotally connected thereto, collars carried by the arms and pivotally connected thereto, said collars being movable toward and away from the bracket by adjusting the angular position of the arms, a vertical shaft extending through the collars, a lamp at the upper end of the vertical shaft, a lateral arm at the lower end of the vertical shaft, an operating lever pivotally mounted on the vehicle axle, and operative connections between the operating lever and the lateral arm of the shaft on the one hand and the steering rod of the vehicle on the other hand.

7. A dirigible headlight for vehicles, including a clamp adapted to be fitted upon the vehicle frame, arms extending upwardly and downwardly from the clamp, collars carried by the arms, a vertical shaft extending through the collars and provided at its upper end with a shoulder resting upon the upper collar, a lamp carried by the upper end of the shaft, a sleeve fitted upon the lower end of the shaft and provided with a bearing engaging the lower collar, a lateral arm projecting from the sleeve, and an operative connection between the lateral arm and the steering gear of the vehicle.

In testimony whereof I have signed my name to this specification in the presence of two subscribing witnesses.

WALTER SUMMERS.

Witnesses:
W. A. GEARHART,
ROBT. BATHIN.

Copies of this patent may be obtained for five cents each, by addressing the "Commissioner of Patents, Washington, D. C."